INVENTOR:
WILLIAM T. NANCE

Aug. 5, 1952    W. T. NANCE    2,605,780
AUTOMATIC TANK SWITCHER
Filed Dec. 13, 1949    4 Sheets-Sheet 3

INVENTOR:
WILLIAM T. NANCE
BY: [signature]
HIS ATTORNEY

Aug. 5, 1952

W. T. NANCE 2,605,780

AUTOMATIC TANK SWITCHER

Filed Dec. 13, 1949

SOLENOID TYPE VALVE

INVENTOR:

WILLIAM T. NANCE

BY:

HIS ATTORNEY

Patented Aug. 5, 1952

2,605,780

UNITED STATES PATENT OFFICE 2,605,780

AUTOMATIC TANK SWITCHER

William T. Nance, Kilgore, Tex., assignor to Shell Development Company, San Francisco, Calif., a corporation of Delaware Application December 13, 1949, Serial No. 132,686

9 Claims. (Cl. 137—122)

The present invention relates to automatic control systems and pertains more particularly to an electrically-operated automatic control system for selectively controlling the flow of a fluid to any storage tank of a multiple-tank battery.

In some industries, such as for example the petroleum industry, storage facilities may comprise a battery of tanks. In order that a petroleum crude or product may be received continuously from its source and at the same time be measured and delivered by pipe line to other points, a tank battery is employed consisting of at least two and generally four or more large tanks all having valved inlet and outlet lines connected to common incoming and outgoing main pipe lines, respectively.

Many tank batteries are equipped with manually-operated valves in the inlet and outlet lines. Thus, when oil is delivered to the tank battery a pumper or gauger manually opens the inlet valve to one tank, closes it when the tank is full or filled to the desired level and repeats this operation with every empty tank while at the same time making deliveries from the full tanks. To eliminate the human element and manpower needed to handle deliveries to and from a tank battery, various control systems have been devised for automatically routing said deliveries. Mechanical control devices have been found to be cumbersome and generally adaptable for limited use only, while electrically-operated control systems employing relays, stepping relays, cam timers, etc., to perform automatic switching operations have been expensive and subject to operating failures.

It is, therefore, a primary object of this invention to provide an inexpensive electrically-operated tank switching control system of simple design adapted automatically to deliver fluid from a main pipe line or header to a battery of two or more storage tanks, said delivery being made only to an empty tank.

It is also an object of the present invention to provide an electrically-operated tank switcher that automatically by-passes any tanks in a tank battery that are either full or being emptied, or have been taken off the line to be cleaned.

These and other objects and advantages of the present invention will become apparent from the following detailed description taken with reference to the drawing, wherein.

Figure 1:
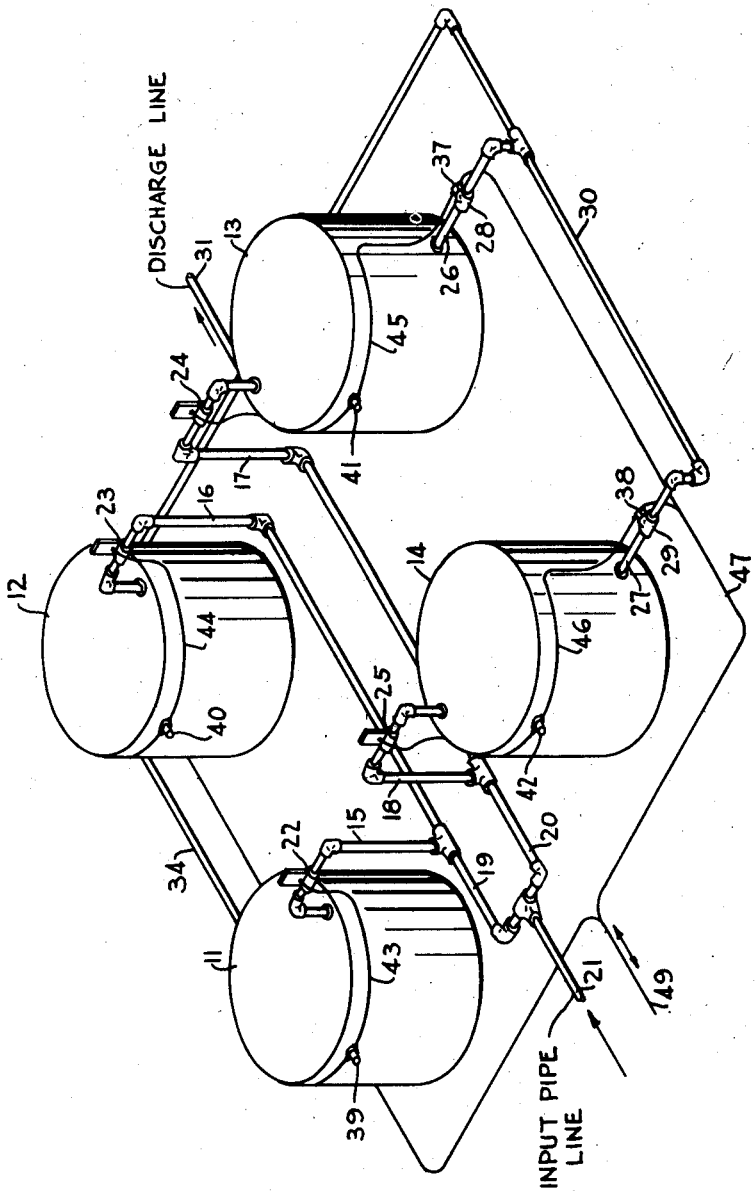
Figure 1 is an isometric view illustrating a battery of four storage tanks connected to common delivery and discharge pipe lines.
Figure 7:
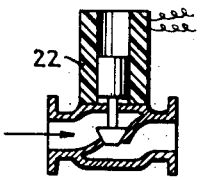
Figure 7 is a view in cross section of an electrically-operated inlet valve.

Referring to Figure 1 of the drawing, a battery of four cylindrical storage tanks 11, 12, 13 and 14 is illustrated as being connected through intake conduits 15, 16, 17 and 18 and headers 19 and 20 to an incoming pipe line 21, as for example, from a separator (not shown). Flow through the inlet conduits 15, 16, 17 and 18 is controlled by electrically-operated or relay-actuated inlet valves 22, 23, 24 and 25 which may be actuated by suitable motor means, i. e., either of the solenoid or motor-driven type, both types being well known to the art. The inlet valves are preferably of a type that will open when energized and will automatically close in case of power failure. Since the valves do not comprise the novel part of this invention, they will not be further described here except as diagrammatically shown in Figure 7 with regard to valve 22.

Each tank is also provided with a valved outlet line near or at the bottom for draining the tank. In Figure 1, the discharge lines 26 and 27 of tanks 13 and 14 having valves 28 and 29 therein are connected through header 30 to a main discharge pipe line 31. It will be appreciated that tanks 11 and 12 are also provided with discharge lines that are connected through header 34 with pipe line 31. The discharge valves may be manually, hydraulically or electrically operated, but will be described for simplicity as manually-operated valves.

Figure 2:
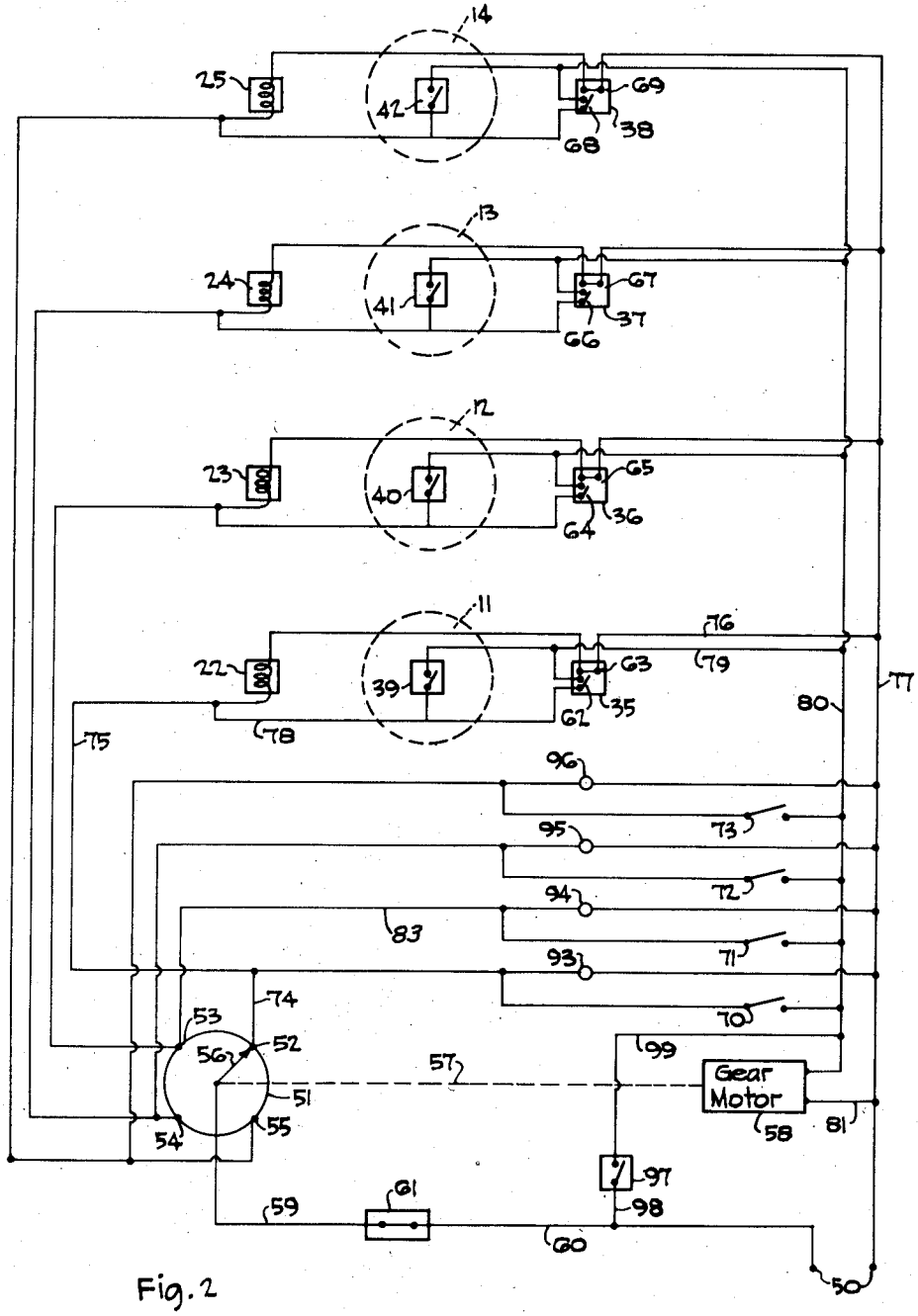
Figure 2 is a schematic diagram of the electrical circuit of an automatic tank switcher of the present invention.
Figure 8:
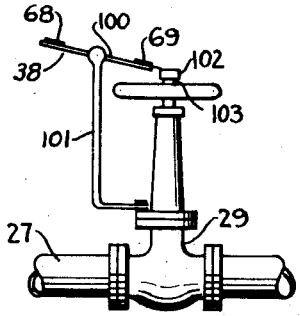
Figures 8 and 9 are front and top views of an embodiment of switch means having two pairs of contacts and mounted adjacent a valve for actuation thereby.
Figure 9:
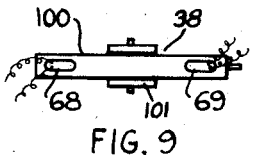
Figure 11:
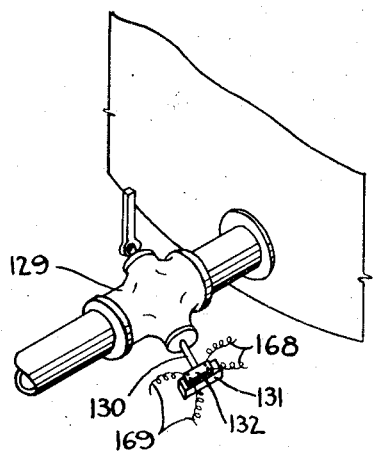
Figure 11 is an isometric view of switch means mounted adjacent an outlet valve of the plug type.

Each discharge valve, such as 28 or 29, is provided with electrical switch means, such as, for example, a double-pole, single-throw mercury-sealed type switch having one set of contacts normally open and the other set normally closed. For example, as shown in Figures 8 and 9, a switch 38 is mounted on the outlet valve 29 so that one set of contacts 68 of the switch is closed when the valve is open while the other set of contacts 69 is closed when the valve is shut. For purposes of illustration, the switch 38 is shown as a bar member 100 pivotally mounted above outlet valve 29 on suitable support means 101. The two sets of contacts 68 and 69 of switch 38 may comprise a pair of switches, such as, microswitches or switches of the sealed-mercury type. A collar 102 mounted on the rising stem 103 of the valve tilts the bar 100 upward when the valve is open, to open contacts 69 and close contacts 68. Similar switches 35, 36 and 37 are mounted on outlet valves of tanks 11, 12 and 13 (Figure 2). In the event that the discharge valve on the tank is of the plug type rather than of the rising-stem type, the plug valve 129 (Figure 11) may have a shaft 130 attached to the plug within the valve and movable therewith. The shaft 130 extends through the valve housing and a bar member 131 is affixed to its extended end. Suitable switch means may be mounted on said bar 131, such as a double-pole single throw sealed mercury type switch 132, having two sets of contacts 168 and 169.

Figure 10:
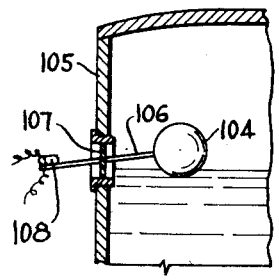
Figure 10 is a view, partly in cross section, of a portion of a storage tank equipped with a float-type level indicator.

Mounted at any desired height on the wall of each tank and near the top thereof is an electrically operated liquid level indicator such as shown in Figure 1 at 39, 40, 41 or 42, that is, a level indicator having electrical switch means adapted to be closed or opened when the level of liquid within the tank rises to a predetermined height. For example, the level indicator may be of the movable-float type having a single-pole, single-throw type switch mounted on or adjacent the float, said switch being closed by movement of the float when the rising liquid in the tank raises the float. The level indicator shown in Figure 10 comprises a float 104 in a tank 105 secured to a movable arm 106 extending through a fluid-tight flexible seal 107 in the wall of the tank. A sealed-mercury type switch 108 is mounted on the other end of arm 106 so that its contacts are closed when the float is raised.

Electrical leads between the inlet valves 22, 23, 24, and 25, the liquid level indicators 39, 40, 41 and 42 and the switches 35, 36, 37 and 38 on the outlet valves in Figure 1 are mounted in conduits or single cables 43, 44, 45 and 46 which lead through common conduits 47, 48 and 49 to a control panel (not shown).

The electrical circuit of the present tank switcher system is schematically shown in Figure 2. The system comprises a plurality of tank circuits connected to a common power source 50 through a selector switch having a movable contact adapted to contact successively, a plurality of fixed contacts, the transfer from contact to contact being effected as a substantially instantaneous snap action. Instead of a rotary snap-action type selector switch, a shorting type rotary switch may be used. In this type of switch the rotating movable contact makes contact with the next position before breaking contact with the last position. The movement from one contact to another is substantially instantaneous. For example, a single-pole selector switch having 2 to 16 positions or more depending on the number of storage tanks in the battery may be used. The switch 51 shown is a single-pole 4-position switch having four positions or stationary contacts 52, 53, 54 and 55. The movable contact 56 of the switch is fixedly connected to a shaft 57 (diagrammatically represented by a broken line) driven by an electrical gear motor 58 or a motor whose speed has been reduced by a suitable gear train. For example, a 1/60th H. P. gear motor, having an output shaft speed of about 10 R. P. M., may be used. The rotary contact 56 of switch 51 is connected to the power source 50 through leads 59 and 60 and a main switch 61.

In the following description and in the appended claims, the electrical circuit interconnecting the inlet valve, float switch and outlet valve switches on each tank with the motor-driven rotary selector switch and the power source will be spoken of as a tank circuit. Each tank circuit, for example, the tank circuit of storage tank 11, comprises two branch circuits in parallel having rotary selector switch 51 in series with and common to both branch circuits. It is to be noted that the outlet valve switch 35 has two sets of contacts 62 and 63. The other valve switches 36, 37 and 38 also have similar pairs of contacts 64, and 65, 66 and 67, and 68 and 69, respectively.

For simplification in describing the parallel branch circuits, they are herein traced from the terminals 50. One branch circuit of the tank circuit 11 comprises lead 60, switch 61, lead 59, rotary arm 56 of selector switch 51, lead 75, solenoid valve 22, contacts 63 of switch 35 and leads 76 and 77, all of said elements being arranged in series. This circuit may be known as the "inlet valve" branch circuit. The other, or "motor," branch circuit comprises lead 60, switch 61, lead 59, and arm 56 of selector switch 51 which is in series with float switch 39, contacts 62 of switch 35 and toggle switch 70, said switches 39, 35 and 70 also being arranged in parallel with each other.

The individual tank circuits of the system may be provided with indicator lights 93, 94, 95 and 96 which may be mounted on a central control panel to glow whenever the inlet valve on any tank is energized and hence open. The indicator lamps, being of high resistance, prevents any substantial amount of current from flowing directly from rotary switch 51 to lead 77.

Thus, with the main switch 61 and contacts 52 and 56 of the rotary snap switch 51 closed, current will flow through leads 74 and 75, through the coil of the solenoid valve 22, across closed contacts 63, which are closed when the outlet valve is closed and through leads 76 and 77 to the power supply 50. With current flowing through the inlet valve circuit, the valve 22 opens and remains open until the tank is substantially filled with liquid.

When the liquid level rises to the float switch or level indicator, its switch 39 is closed whereby the current by-passes valve 22, flowing from lead 75 through lead 78, closed switch 39 and leads 79 and 80, to the gear motor 58, which is energized and rotates contact 56 of switch 51 from position 52 to 53. This breaks the circuit of motor 58 through closed switch 39 of tank 11, and as the corresponding switch 40 of tank 12 is not yet closed, said tank 12 having not yet been filled, the motor 58 is de-energized and stops rotating thereby leaving contacts 56 and 53 closed or in register with each other. Current is now directed through the tank circuit of tank 12, said tank 12 being filled in a manner similar to that described for tank 11.

Figure 3:
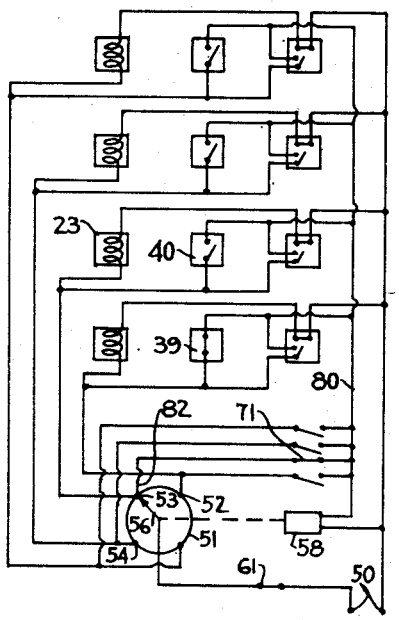
Figures 3 and 4 are schematic diagrams of simplified electrical circuits of the present tank switcher illustrating the position of the switches during various operations.

Preferably, the circuits of tanks 11, 12, 13 and 14 are provided with by-pass switches 70, 71, 72 and 73, respectively. These switches are used to eliminate one or more tanks from the switching sequence in the event that an empty tank is to be cleaned or repaired, or for other similar reasons. Thus, assuming that tank 12 was being cleaned and its by-pass switch 71 had been closed as shown in Figure 3, after tank 11 has been filled as previously described and the contact 56 of the rotary snap switch has moved to contact 53, the current will pass through lead 83, closed switch 71 and lead 80 to the motor 58. The motor circuit of tank 12 is thus closed and the motor 58 remains energized so as to rotate the movable contact 56 to next position 54 as shown in Figure 4.

Figure 4:
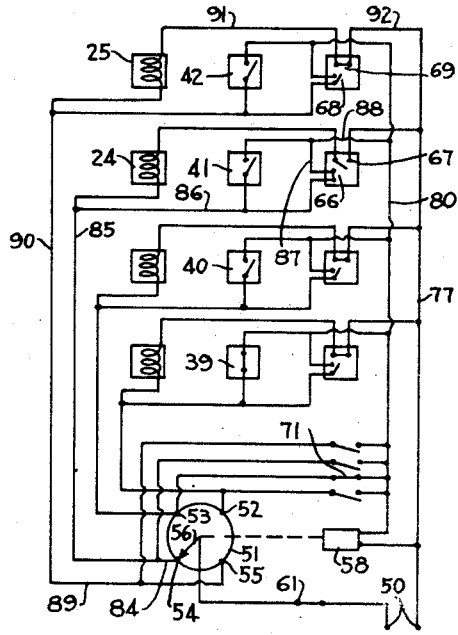

In Figure 4, float switch 39 is closed since tank 11 has been filled and by-pass switch 71 is closed to take tank 12 out of service. Contact 56 of rotary snap switch 51 has moved to position 54 so as to close the tank circuit of tank 13 (Figure 2). Normally the coil of the inlet valve 24 would be energized, but since it is assumed that the tank 13 is being emptied, the outlet valve is open whereby contacts 66 are closed while contacts 67 have been opened. Thus, the current by-passes the control winding or relay of inlet valve 24, flowing from rotary switch 51 through leads 85 and 86, closed switch 66 and leads 87, 88 and 80, thus closing the motor branch circuit of tank 13 whereby the motor 58 remains energized and contact 56 is moved to position 55. With contacts 55 and 56 of rotary switch 51 in register, the inlet valve branch circuit of the fourth tank is closed, the current flowing from switch 51 through leads 89 and 90, solenoid 25, lead 91, closed switch 69 and leads 92 and 77 to the power source 50.

From the above description, it will be seen that the present tank selector or switcher system will skip a tank in the battery that is full, being emptied, or taken out of service for repairs or cleaning. The motor-driven rotary selector switch continues to rotate until an empty tank is found having its outlet valve closed so that the contacts 63, 65, 67 or 69 are closed, whereby the inlet valve branch circuit of the empty tank is closed thus energizing and opening an electrically-operated inlet valve 22, 23, 24 or 25.

Figure 5:
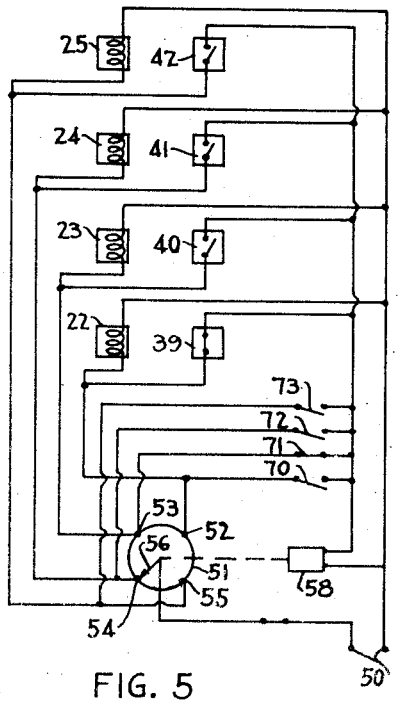
Figures 5 and 6 are schematic diagrams of other embodiments of the present tank switcher control system.

The incorporation in the motor branch circuit of the switches on the outlet valves is for the purpose of preventing fluid from being run inadvertently into a tank from which fluid is being discharged into the outlet pipe line 31 (Figure 1). If desired, the switches 35, 36, 37 and 38 on the outlet valves, as shown in Figure 2, may be dispensed with in another embodiment of the present tank switcher system as shown diagrammatically in Figure 5. In this embodiment the four storage tanks are provided with electrically-controlled level indicators having switches 39, 40, 41 and 42 and tank circuits having by-pass switches 70, 71, 72 and 73.

This embodiment, will operate in a manner similar to that of the embodiment shown in Figure 2 in delivering fluid selectively to empty tanks in the battery and shutting off the flow to each tank as it is filled. When a tank is emptied or cleaned its by-pass switch would be closed so that the selector switch would skip that tank.

Figure 6:
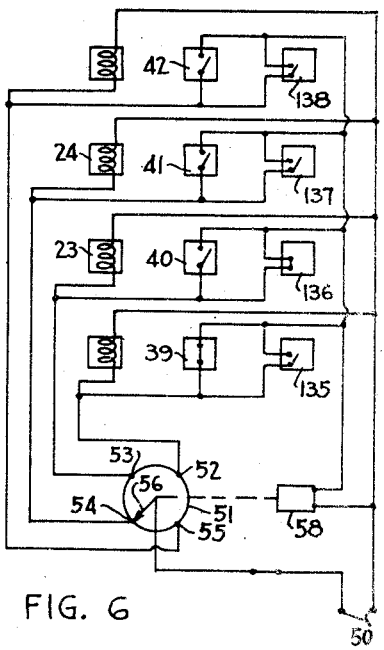

Another embodiment of the present automatic switcher is shown in Figure 6 wherein the by-pass toggle switches 70, 71, 72 and 73 of the circuit in Figure 2 have been eliminated. This system would operate in a manner similar to that described with regard to Figure 2. When a tank is being cleaned its outlet valve may be left open so that the selector switch will skip that tank. In the embodiment of Figure 6, the outlet valve switches 135, 136, 137 and 138 are single-pole switches which are closed by the opening of the corresponding outlet valves. Hence, upon the opening of the outlet valve of the second tank, switch 136 is closed, the motor 58 remains energized and the contact 56 moves to position 54 thereby energizing the electric inlet valve 24 on the empty third tank.

The circuit shown in Figure 2 may also be equipped with a manual selector switch 97 which, through leads 60, 98, 99 and 80, connects the motor 58 directly to the power source thereby by-passing the tank circuits. The closing of switch 97 causes the motor-driven rotary snap-switch 51 to rotate continuously. Thus, by opening the manual selector switch 97 at the correct moment, the rotary snap-switch 51 can be stopped in any of its positions, 52, 53, 54 or 55. This feature allows an operator to select any tank in the battery as the starting point of the filling cycle.

I claim as my invention:

1. An automatic system for selectively controlling the flow of fluid from a common source into a tank of a multiple-tank battery, each of said tanks having an intake line in communication with said common source, electrically actuated inlet valve means in said intake line, liquid level indicating means mounted on said tank, said indicating means being equipped with electrical switch means, and valved outlet means equipped with first and second electrical switch means, said system comprising a selector switch, prime mover means for actuating said selector switch, and a power source, said prime mover means being electrically connected to each of said level indicator switch means, to one of said switch means on each of said tank outlet valve means and to said selector switch, said tank inlet valve means, said switch means on said level indicator and said outlet valve switch means of each of said tanks being connected in parallel through the selector switch to the power source.

2. A control system for selectively filling a storage tank battery, comprising a plurality of tanks having electrically actuated fluid inlet valve means, liquid level indicating means on each tank responsive to the rise of fluid to a predetermined level therein, first electrical switch means actuated by said level indicating means, outlet valve means controlling the discharge of fluid from each tank, second electrical switch means having two pairs of contacts, one of said pairs of contacts opening as the other closes, one of said pairs of contacts mounted adjacent said outlet valve means for opening and closing together with said outlet valve means, a selector switch having a movable contact arm and a plurality of stationary contacts, an electric motor for moving said contact arm, a power source, and tank control circuit means for each tank in said battery for selectively energizing the relay actuated valve and said selector switch motor, said control circuit means being connected to the electric motor and to one of the stationary contacts of the selector switch, each of said tank control circuit means comprising first and second parallel branch circuits in series with a common contact of said selector switch, said first branch circuit comprising the level indicating switch means and the first contact pair of said tank outlet valve switch means in parallel with each other and in series with the motor, whereby said motor is energized to rotate said selector switch on closure of any of the first branch switch means, said second branch circuit comprising said relay switch means of said inlet valve means in series with the second contact pair of said tank outlet valve switch means.

3. The control system of claim 2 including by-pass switch means in parallel with said level indicating switch means and said first contact pair of said tank outlet valve switch means, and in series with the motor, whereby said motor is energized to rotate said selector switch on closure of one of said switch means.

4. A control system for selectively filling a tank battery, comprising a plurality of tanks having electrically actuated fluid inlet valve means, liquid level indicating means on each tank responsive to the rise of fluid to a predetermined level therein, electrical switch means actuated by said level indicating means, a selector switch having a movable contact arm and a plurality of stationary contacts, an electric motor for rotating said contact arm, a power source, and tank control circuit means for each tank in said battery for selectively energizing one of said relay actuated valves and said selector switch motor, each of said control circuit means being connected to the electric motor and to one of the stationary contacts of the selector switch, each of said control circuit means comprising first and second parallel branch circuits in series with a common contact of said selector switch, said first branch circuit comprising level indicating switch means in series with the motor, whereby said motor is energized to rotate said selector switch on closure of said switch means, said second branch circuit comprising said relay switch means for operating said tank inlet valve means.

5. A control system for selectively filling a storage tank battery comprising a plurality of tanks having solenoid-type inlet valves, liquid level indicating means on each tank responsive to the rise of fluid to a predetermined level therein, electrical switch means actuated by said level indicating means, outlet valves controlling the discharge of fluid from each tank, switch means having two pairs of contacts mounted adjacent each outlet valve and actuated thereby, one of said pairs of contacts opening as the other closes, one of said pairs of contacts opening and closing together with said outlet valve, a rotary selector switch having a movable contact arm and a plurality of stationary contacts, said rotary arm being adapted to close with successive stationary contacts, an electric motor for rotating said contact arm, a power source, and control circuit means for each tank in said battery for selectively energizing one of said solenoid valves and said selector switch motor, each of said control circuit means being connected to the electric motor and to a different stationary contact of selector switch, each of said control circuit means comprising first and second parallel branch circuits in series with a common contact of said selector switch, said first branch circuit comprising the tank level indicating switch means, the first contact pair of said outlet valve switch means and by-pass switch means in parallel with each other and in series with the motor, whereby said motor is energized to rotate said selector switch on closure of any of said switch means, said second branch circuit comprising said solenoid valve in series with the second contact pair of said outlet valve switch means.

6. A system for automatically controlling the flow of fluid from a common source into a tank of a multiple-tank battery, each tank having an intake line in communication with said common source, electrically actuated inlet valve means in said intake line, liquid level indicating means mounted on said tank, said indicating means being equipped with electrical switch means, and valved outlet means equipped with first and second electrical switch means, said first switch means opening when said second switch means closes, said second switch means opening and closing together with said outlet valve means and being connected in series with said tank inlet valve means, said system comprising a rotary snap-type selector switch, an electric motor for rotating said selector switch, and a power source, said selector switch motor being electrically connected to each of said level indicator switch means to said first outlet valve switch means and to said selector switch, said selector switch motor being responsive to the closure of any of said switch means, said relay switch controlled inlet valve means, said switch means on said level indicator and said first outlet valve switch means of each of said tanks being connected in parallel through the common selector switch to the power source.

7. A system for automatically controlling the flow of fluid from a common source into a tank of a multiple-tank battery, each tank having an intake line in communication with said common source, electrically actuated inlet valve means in said intake line, liquid level indicating means mounted on said tank, said indicating means being equipped with electrical switch means, and valved outlet means equipped with electrical switch means, said system comprising a selector switch, prime mover means for actuating said selector switch, and a power source, said prime mover means being electrically connected to each of said level indicator switch means, to said tank outlet valve switch means and to said selector switch, and being responsive to the closure of any of said switch means to actuate said selector switch, said tank inlet valve means, said switch means on said level indicator and said tank outlet valve switch means of each of said tanks being connected in parallel through the common selector switch to the power source.

8. An automatic system for controlling the flow of a liquid from a common source to a plurality of tanks forming a battery, each of said tanks having an inlet valve, an outlet valve, said system comprising a source of power, a selector switch having a plurality of fixed contacts and a movable contact adapted to close in succession with said fixed contacts, said movable contact being electrically connected to said source of power, electromagnetic actuating means at every tank adapted upon energization to open the inlet valve thereof, each of said electromagnetic actuating means being connected to one of said fixed contacts, a motor electrically connected to said power source and mechanically connected to said movable contact, said motor being adapted upon energization to actuate said movable contact into closure with the next fixed contact, first means in circuit with said motor to energize said motor, said means comprising a level indicator switch at each tank adapted to be closed upon the liquid reaching the level of said indicator, and second means in parallel with said first means to energize said motor, said second means comprising a switch mounted at the outlet valve of each tank, said switch being adapted to close when said valve opens.

9. An automatic system for controlling the flow of a liquid from a common source to a plurality of tanks forming a battery, each of said tanks having an inlet valve and an outlet valve, said system comprising two power terminals, a selector switch having a plurality of fixed contacts and a movable contact adapted to close in succession with said fixed contacts, said movable contact being electrically connected to one of said terminals, a plurality of tank control circuits each connected on one side to one of said fixed contacts, each of said tank controlled circuits comprising two parallel branches, the first branch comprising in series electromagnetic actuating means adapted upon energization to actuate the tank inlet valve and a first switch actuated by the tank outlet valve to close together therewith, the second branch comprising in parallel a second switch adapted to be closed by the liquid rising in a tank to a predetermined level and a third switch actuated by the tank outlet valve and adapted to close when said first switch opens, each of said first branches being electrically connected on its other side to the second power terminal, and an electric motor mechanically connected to said movable contact and adapted upon energization to actuate said movable contact, each of said second branches being connected on its other side to the second power terminal through said motor.

WILLIAM T. NANCE.

REFERENCES CITED

The following references are of record in the file of this patent:

UNITED STATES PATENTS

| Number | Name | Date |
| --- | --- | --- |
| 2,116,549 | Zenner | May 10, 1938 |
| 2,340,070 | McCauley | Jan. 25, 1944 |
| 2,340,576 | Bacon | Feb. 1, 1944 |

FOREIGN PATENTS

| Number | Country | Date |
| --- | --- | --- |
| 494,295 | Great Britain | of 1938 |